(12) United States Patent
Yoshikawa

(10) Patent No.: US 11,388,773 B2
(45) Date of Patent: Jul. 12, 2022

(54) COMMUNICATION APPARATUS FOR DATA TRANSMISSION IN A NEIGHBOR AWARE NETWORK (NAN), CONTROL METHOD, AND COMPUTER-READABLE STORAGE MEDIUM

(71) Applicant: CANON KABUSHIKI KAISHA, Tokyo (JP)

(72) Inventor: Yuki Yoshikawa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/995,573

(22) Filed: Jun. 1, 2018

(65) Prior Publication Data
US 2018/0279412 A1 Sep. 27, 2018

Related U.S. Application Data

(63) Continuation of application No. PCT/JP2016/080821, filed on Oct. 18, 2016.

(30) Foreign Application Priority Data

Dec. 3, 2015 (JP) .............................. JP2015-236995

(51) Int. Cl.
*H04W 76/30* (2018.01)
*H04W 84/12* (2009.01)
(Continued)

(52) U.S. Cl.
CPC ............ *H04W 76/30* (2018.02); *H04W 8/00* (2013.01); *H04W 52/028* (2013.01);
(Continued)

(58) Field of Classification Search
CPC ............. H04W 76/30; H04W 52/0216; H04W 52/028; H04W 76/15; H04W 84/18;
(Continued)

(56) References Cited

U.S. PATENT DOCUMENTS 8,190,938 B2  5/2012  Nurminen et al.
8,259,632 B2  9/2012  Seok et al.
(Continued)

FOREIGN PATENT DOCUMENTS

CN  101675625 A  3/2010
CN  101849425 A  9/2010
(Continued)

OTHER PUBLICATIONS

U.S. Appl. No. 62/234,161, filed Sep. 29, 2015.*
(Continued)

*Primary Examiner* — Ian N Moore
*Assistant Examiner* — Rushil Parimal Sampat
(74) *Attorney, Agent, or Firm* — Rossi, Kimms & McDowell LLP

(57) ABSTRACT

Provided is a communication apparatus that can perform first communication in a network during a first period of a predetermined length having a predetermined cycle, and, in the network, can set a second period different from the first period based on the first communication and perform second communication during the second period while continuing the first communication. In a case where the second communication is to be ended, the communication apparatus notifies the partner apparatus of the second communication that the second communication is to be ended, and performs control so as to end the second communication with the partner apparatus according to transmission of the notification.

22 Claims, 11 Drawing Sheets

(51) Int. Cl.
  *H04W 84/18*  (2009.01)
  *H04W 8/00*   (2009.01)
  *H04W 52/02*  (2009.01)
  *H04W 76/15*  (2018.01)

(52) U.S. Cl.
  CPC ....... *H04W 52/0216* (2013.01); *H04W 76/15* (2018.02); *H04W 84/12* (2013.01); *H04W 84/18* (2013.01); *Y02D 30/70* (2020.08)

(58) Field of Classification Search
  CPC ...... H04W 8/00; H04W 84/12; Y02D 70/142; Y02D 70/00
  See application file for complete search history.

(56) References Cited

U.S. PATENT DOCUMENTS

| | | | |
|---|---|---|---|
| 8,396,015 B2 | 3/2013 | Wentink | |
| 9,723,464 B2 | 8/2017 | Patil et al. | |
| 9,813,920 B2 | 11/2017 | Abraham et al. | |
| 9,843,995 B2* | 12/2017 | Abraham | H04W 48/18 |
| 10,075,950 B2* | 9/2018 | Patil | H04W 72/0446 |
| 2013/0273850 A1 | 10/2013 | Kim et al. | |
| 2014/0254569 A1 | 9/2014 | Abraham et al. | |
| 2014/0302787 A1 | 10/2014 | Rantala et al. | |
| 2014/0341073 A1 | 11/2014 | Abraham | |
| 2015/0098388 A1 | 4/2015 | Fang | |
| 2015/0109981 A1 | 4/2015 | Patil et al. | |
| 2015/0282149 A1 | 10/2015 | Abraham et al. | |
| 2015/0296416 A1 | 10/2015 | Lee et al. | |
| 2015/0341447 A1 | 11/2015 | Patil et al. | |
| 2016/0150466 A1* | 5/2016 | Jung | H04W 8/005 455/434 |
| 2016/0157089 A1* | 6/2016 | Qi | H04W 8/005 370/254 |
| 2016/0226928 A1* | 8/2016 | Park | H04W 4/06 |
| 2017/0094554 A1* | 3/2017 | Liu | H04W 8/005 |
| 2018/0070308 A1* | 3/2018 | Park | H04W 48/16 |

FOREIGN PATENT DOCUMENTS

| | | |
|---|---|---|
| CN | 104081855 A | 10/2014 |
| CN | 104662937 A | 5/2015 |
| CN | 105027662 A | 11/2015 |
| EP | 2943032 A1 | 11/2015 |
| JP | 2010521117 A | 6/2010 |
| JP | 2015530058 A | 10/2015 |
| KR | 1020090132592 A | 12/2009 |
| KR | 1020100106300 A | 10/2010 |
| KR | 101381448 B1 | 4/2014 |
| RU | 2011135484 A | 3/2013 |
| WO | 2008111826 A1 | 9/2008 |
| WO | 2014047125 A1 | 3/2014 |
| WO | 2015057955 A1 | 4/2015 |

OTHER PUBLICATIONS

U.S. Appl. No. 62/091,081, filed 2014.*
International Search Report issued in Intl. Appln. No PCT/JP2016/080821 dated Jan. 17, 2017. English translation provided.
Written Opinion issued in Intl. Appln. No. PCT/JP2016/080821 dated Jan. 17, 2017.
Office Action issued in Korean Appln. No. 10-2018-7018002 dated May 8, 2019.
Extended European Search Report issued in European Appln. No. 16870316.3 dated Apr. 29, 2019.
Office Action issued in Russian Appln. No. 2018123950 dated Apr. 4, 2019. English translation provided.
Office Action issued in Japanese Appln. No. 2015-236995 dated Sep. 20, 2019.
Office Action issued in Chinese Appln. No. 201680070841.7 dated Jul. 16, 2020. English translation provided.
Office Action issued in European Appln. No. 20154780.9 dated Mar. 2, 2021.

* cited by examiner

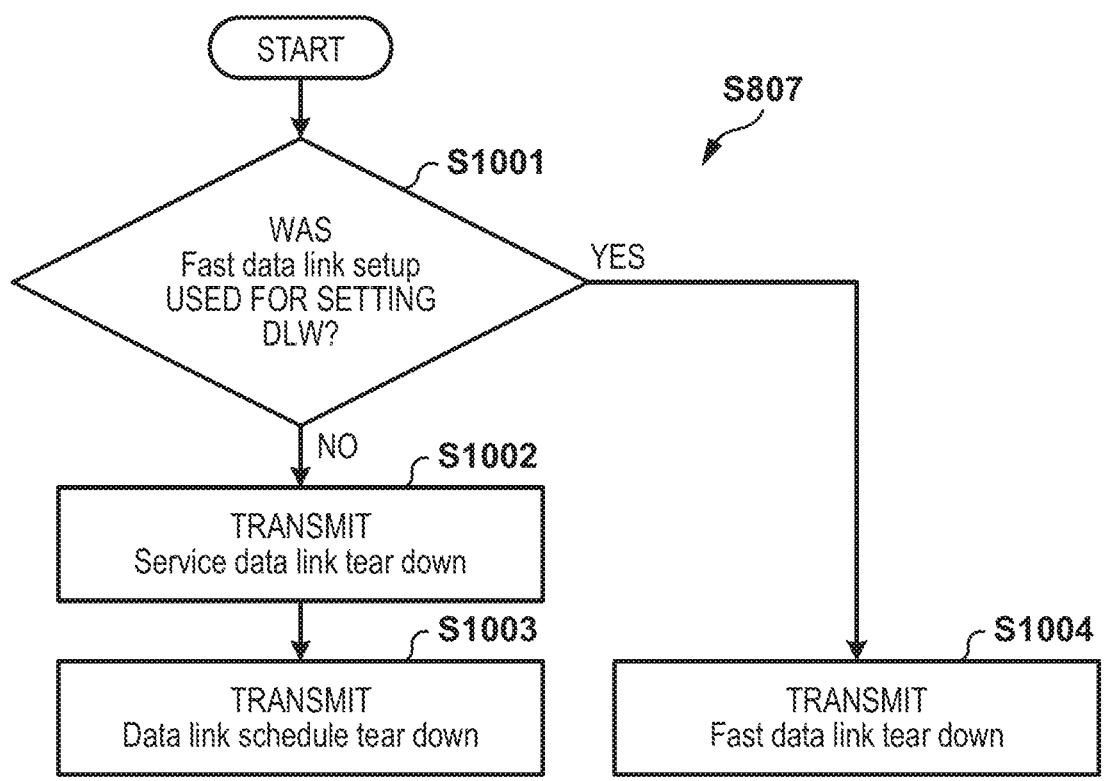
F I G. 10

COMMUNICATION APPARATUS FOR DATA TRANSMISSION IN A NEIGHBOR AWARE NETWORK (NAN), CONTROL METHOD, AND COMPUTER-READABLE STORAGE MEDIUM

CROSS-REFERENCE TO RELATED APPLICATIONS

This application is a Continuation of International Patent Application No. PCT/JP2016/080821, filed Oct. 18, 2016, which claims the benefit of Japanese Patent Application No. 2015-236995 filed on Dec. 3, 2015, both of which are hereby incorporated by reference herein in their entirety.

BACKGROUND OF THE INVENTION

Field of the Invention

The present invention relates to a communication apparatus, a control method, and a storage medium, and in particular it relates to a technique for lowering power consumption for communication.

Background Art

In recent years, wireless LANs typified by the IEEE802.11 standard series are widely used, and accordingly, products in various network forms of wireless LANs and specification standards have appeared. Patent Literature 1 describes a NAN (Neighbor Awareness Network) that is stipulated by the Wi-Fi Alliance as a standard for discovering a communication apparatus, a service provided by the communication apparatus, and the like while saving power. This is intended to save power consumption by a communication apparatus synchronizing with another communication apparatus with respect to a period during which those communication apparatuses exchanges information with each other, and reducing a time when a wireless RF (Radio Frequency) unit is enabled. Note that, hereinafter, a communication apparatus that operates in accordance with a NAN standard is referred to as a NAN device.

A period for synchronization in a NAN is called a DW (Discovery Window). The DW period is repeated in a constant cycle, and NAN devices that have joined a NAN cluster can share information regarding existence of another NAN device and a service/an application of the other NAN device at least during one of the repeated DW periods. In addition, a group of NAN devices that share DW periods is called a NAN cluster. Terminals that have joined the NAN cluster transmit/receive, during DW periods, a signal (Sync Beacon) for indicating that a DW period is ongoing and securing synchronization between terminals, signal for sharing application information, and the like. A NAN device that is searching for a service/an application transmits a service request/supply signal (Service Discovery Frame (SDF)) during DW periods.

CITATION LIST

Patent Literature

PTL1: US-2014-0302787

A NAN device can search for a service provided by another NAN device with low power consumption, and can notify that the NAN device provides a service that another NAN device is searching for. However, power consumption for communication after NAN device discovers a service has not been taken into consideration.

The present invention provides a mechanism for reducing power consumption for communication after a communication apparatus discovers a service.

SUMMARY OF THE INVENTION

In order to solve the above-described issue, a communication apparatus according to the present invention includes: a communication unit that can perform first communication in a network during a first period of a predetermined length having a predetermined cycle, and, in the network, can set a second period different from the first period based on the first communication and perform second communication during the second period while continuing the first communication; a notification unit configured to notify, in a case where the second communication is to be ended, a partner apparatus of the second communication that the second communication is to be ended; and a control unit configured to perform control so as to end the second communication with the partner apparatus according to transmission of the notification.

Further features of the present invention will become apparent from the following description of exemplary embodiments with reference to the attached drawings.

BRIEF DESCRIPTION OF THE DRAWINGS

The attached drawings are included in the specification, constitute a portion of the specification, show embodiments of the present invention, and are used for describing the principle of the present invention along with description in the specification.

FIG. 10 is a flowchart showing an example of a flow of processing for transmitting notification when ending communication during DLW periods.

DESCRIPTION OF THE EMBODIMENTS

The present invention will be described below in detail based on embodiments thereof with reference to the attached drawings. Note that configurations and procedures that will be described below are merely examples, and the present invention is not limited to the examples. Also, an example will be described below in which a wireless LAN system that complies with a Neighbor Awareness Network (NAN) standard is used, but the present invention is not limited thereto. Specifically, the following discussion can be applied to any wireless communication system in which a communication apparatus periodically turns on the RF function to discover a service, and then performs communication related to the service. Note that, hereinafter, a standard that the communication apparatus complies with is referred to as a "NAN standard", and a network for searching for and discovering a service, which has been formed in accordance with the NAN standard, is referred to as a "NAN".

Configuration of Wireless Communication System

Figure 1:
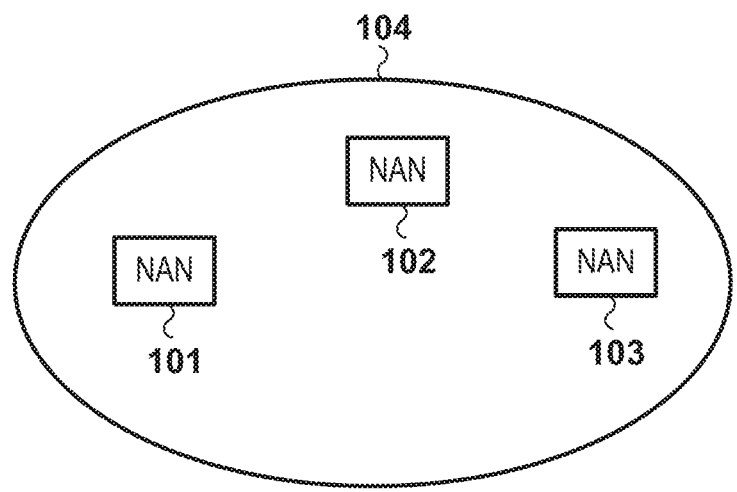
FIG. 1 is a diagram showing a configuration example of a wireless communication system.

FIG. 1 shows a configuration example of a wireless communication system according to this embodiment. This wireless communication system is constituted by including wireless communication apparatuses (NAN devices 101 to 103) that can operate in accordance with the NAN standard. Note that the wireless communication system may include other communication apparatuses such as access points and terminals (not illustrated). In addition, the NAN devices 101 to 103 may be any communication apparatus that can join a NAN, and perform communication according to an application.

The NAN devices 101 to 103 may be able to find communication apparatuses around the NAN devices 101 to 103 and services provided by those communication apparatuses, or enable NAN devices around the NAN devices 101 to 103 to find services that can be provided by the NAN devices 101 to 103, based on the NAN standard. In the NAN, a NAN cluster is defined as NAN devices that share a cycle in which the RF function is on, and the NAN devices join the NAN cluster. FIG. 1 shows a state where the NAN devices 101 to 103 have joined a NAN cluster 104. In order to join the NAN cluster 104, the NAN devices 101 to 103 perform processing prescribed in the NAN standard, such as processing for receiving a Discovery Beacon transmitted by a NAN device that operates as a Master of the NAN cluster 104. Note that it is assumed here that such processing is completed already, and a detailed description thereof will not be given. Note that a NAN device can join a plurality of NAN clusters, and a plurality of NAN clusters may have different DW (Discovery Window) periods.

Assume that the NAN devices 101 and 103 have joined the NAN cluster 104 as Non-Master Non-Syncs, and the NAN device 102 has joined the NAN cluster 104 as a Master or an Anchor Master. Accordingly, during a DW period, the NAN device 102 transmits a Sync Beacon, and the NAN devices 101 and 103 do not transmit a Sync Beacon. Note that the NAN devices 101 and 103 can also operate as a Master or a Non-Master Sync, playing a role of transmitting a Sync Beacon, for example.

In addition, the NAN device 101 is a Subscriber that is looking for a predetermined service, and the NAN device 103 is a Publisher that can provide the predetermined service that the NAN device 101 is looking for.

As described above, the NAN cluster 104 is a network that the NAN devices 101 to 103 have joined. Assume that, in this embodiment, the NAN devices that have joined the NAN cluster 104 build a network at 6ch. The NAN cluster 104 is a NAN cluster in which the length of a DW period of is 16 TU (Time Unit: 1 TU is 1024 microseconds), and a time interval from a start timing of a DW period to a start timing of the next DW period is 512 TU. Note that the wireless channel and DW periods used by the NAN cluster are not limited thereto, and at least one of another channel and other DW periods having another period length or interval may be used.

In general, there are cases where, after discovering/detecting a service, a NAN device performs communication related to an application for actually executing the service. In this case, the NAN device may establish a PostNAN for communication related to the application, not a NAN. A PostNAN is a network different from a NAN cluster. The PostNAN includes an infrastructure network, IBSS, Wi-Fi Direct, and the like. The NAN device can perform communication according to the application during periods other than DW periods by establishing the PostNAN.

A NAN device can also establish connection with another NAN device within the NAN in one-to-one correspondence without constituting a network different from the NAN cluster such as a PostNAN, and perform communication related to an application. Accordingly, the NAN device can perform communication related to the application within the NAN cluster during periods that do not overlap DW periods. In this case, before performing communication related to the application in one-to-one correspondence, the NAN device can execute negotiation regarding a timing (period) for executing communication related to the application with the NAN device that is a communication partner apparatus in one-to-one correspondence. This makes it possible for the NAN device to perform communication related to the application with another NAN device within the NAN cluster while staying within the NAN cluster.

In the case of performing communication during periods that do not overlap DW periods, a NAN device may maintain a state where frame transmission/reception can be performed during the periods for the communication even after a state is entered where frame transmission/reception is not required to be performed. In this case, the power consumption of the NAN device may increase, and furthermore, the power consumption of the NAN device that is a communication partner may increase similarly.

In contrast, in this embodiment, in the case where a NAN device performs communication during periods that do not overlap DW periods, the NAN device prevents continuation of a state where frame transmission/reception can be performed, for a longer time than necessary, so as to reduce the power consumption. The configuration of the NAN device that executes such processing and the processing that is executed will be described below in detail. Note that the following discussion can be applied to any communication apparatus that can periodically search for/discover a service during a time section of a certain length, while being able to perform data communication related to the service during the remaining time section, and a range in which the following discussion can be applied is not limited to a NAN device.

Configuration of NAN Device

Figure 2:
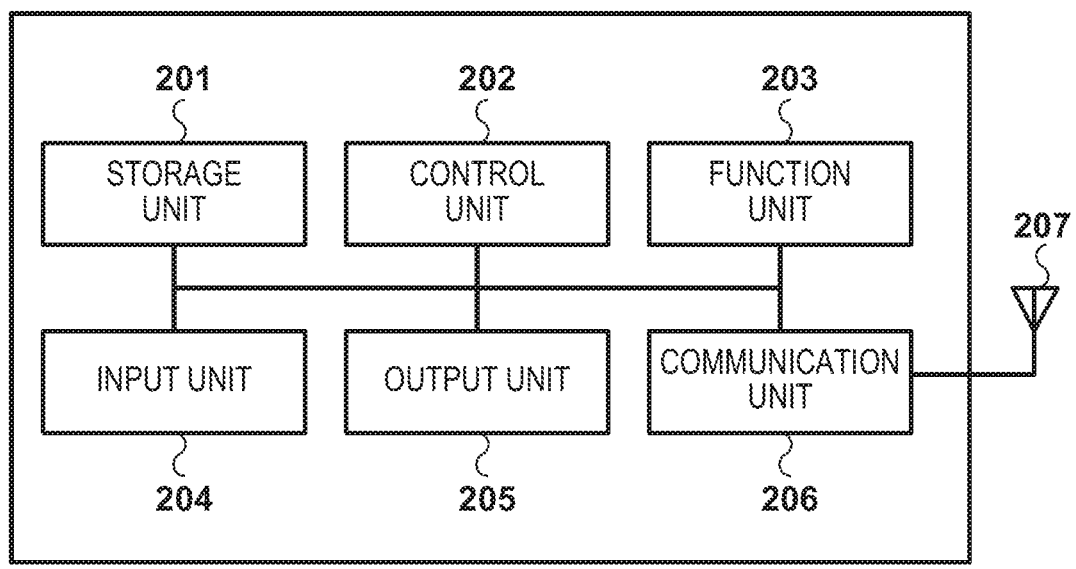
FIG. 2 is a diagram showing a hardware configuration example of a NAN device.

FIG. 2 shows a hardware configuration example of the NAN device 101. Note that the hardware configurations of the NAN devices 102 and 103 may be similar to that of the NAN device 101. The NAN device 101 includes, as a hardware configuration thereof, a storage unit 201, a control unit 202, a function unit 203, an input unit 204, an output unit 205, a communication unit 206, and an antenna 207, for example.

The storage unit 201 is constituted by both or one of a ROM and a RAM, and stores various types of information such as programs for performing various operations, which will be described later, and communication parameters for wireless communication. Here, ROM is an acronym of Read Only Memory, and RAM is an acronym of Random Access Memory. Note that a storage medium such as a flexible disk, a hard disk, an optical disk, a magneto-optical disk, a CD-ROM, a CD-R, a magnetic tape, a nonvolatile memory card, or a DVD may be used as the storage unit 201 in addition to a memory such as a ROM or a RAM.

The control unit 202 is constituted by a CPU or an MPU, and controls the entirety of the NAN device 101 by executing programs stored in the storage unit 201. Here, CPU is an acronym of Central Processing Unit, and MPU is an acronym of Micro Processing Unit. Note that the control unit 202 may control the entirety of the NAN device 101 by cooperation of a program stored in the storage unit 201 and an OS. Here, OS is an acronym of Operating System. The control unit 202 also controls the function unit 203 so as to execute predetermined processing such as image capturing, printing, and projection.

The function unit 203 is hardware for the NAN device 101 to execute predetermined processing. For example, in the case where the NAN device 101 is a camera, the function unit 203 is an image capturing unit, and performs image capturing processing. In addition, for example, in the case where the NAN device 101 is a printer, the function unit 203 is a printing unit, and performs printing processing. In addition, for example, in the case where the NAN device 101 is a projector, the function unit 203 is a projection unit, and performs projection processing. Data that is processed by the function unit 203 may be data stored in the storage unit 201, or may be data communicated with another NAN device via the communication unit 206 to be described later.

The input unit 204 receives various operations from the user. The output unit 205 performs various types of output to the user. Here, output performed by the output unit 205 includes at least one of display on the screen, sound output through a speaker, vibration output, and the like. Note that one module may realize both the input unit 204 and the output unit 205, such as a touch panel.

The communication unit 206 controls wireless communication that complies with IEEE802.11 series and controls IP communication. IP is an acronym of Internet Protocol. The communication unit 206 also controls the antenna 207 so as to transmit/receive a wireless signal for wireless communication. The NAN device 101 communicates contents such as image data, document data, and video data with another NAN device via the communication unit 206.

Figure 3:
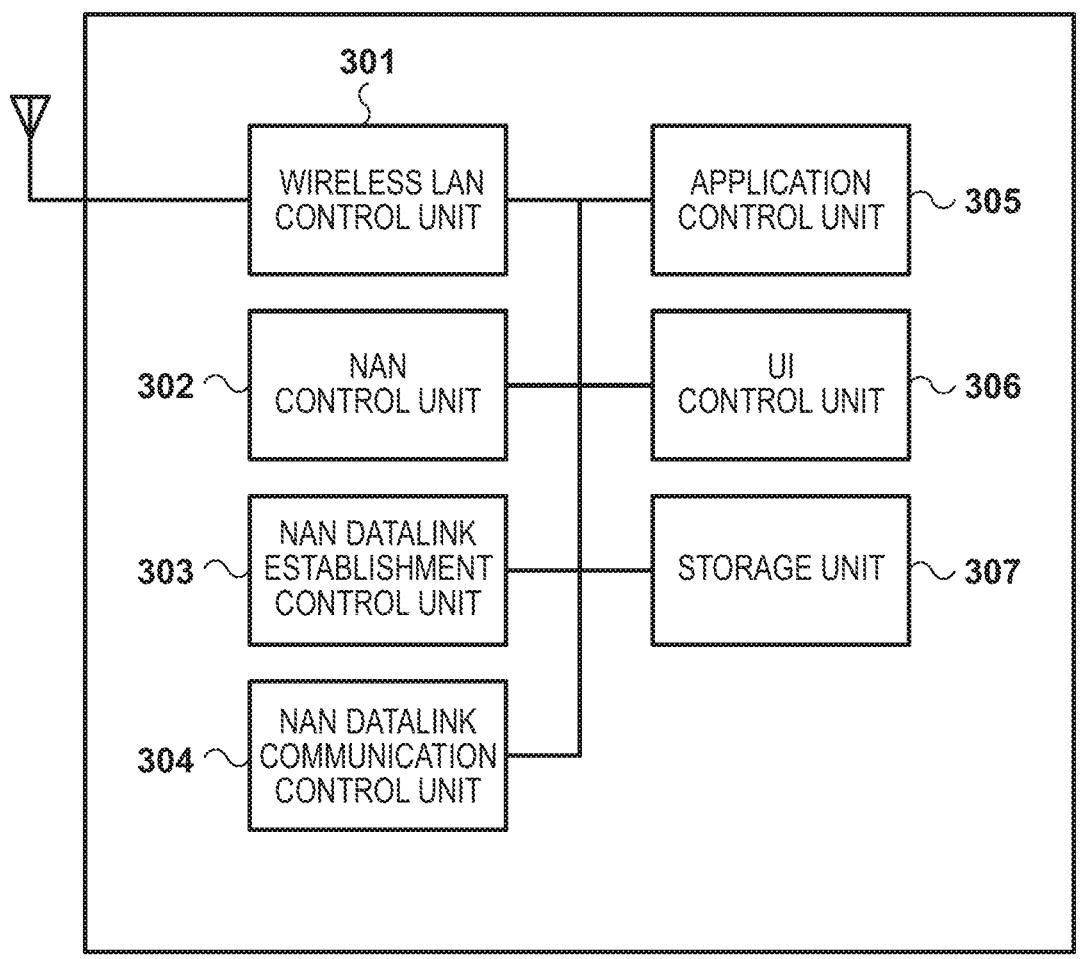
FIG. 3 is a diagram showing a functional configuration example of a NAN device.

FIG. 3 is a diagram showing a functional configuration example of the NAN device 101. Note that the functional configurations of the NAN devices 102 and 103 may be similar to that of the NAN device 101. For example, the NAN device 101 includes, as a functional configuration thereof, a wireless LAN control unit 301, a NAN control unit 302, a NAN datalink establishment control unit 303, a NAN datalink communication control unit 304, an application control unit 305, a UI control unit 306, and a storage unit 307.

The wireless LAN control unit 301 performs control so as to transmit/receive a wireless signal to/from another communication apparatus that can perform communication using a wireless LAN, in accordance with the signal format of a corresponding wireless LAN. The wireless LAN control unit 301 also executes various types of control regarding a wireless LAN in accordance with IEEE802.11 standard series. The NAN control unit 302 executes various types of control regarding service search/discovery and the like in accordance with the NAN standard. The NAN datalink establishment control unit 303 controls establishment of a datalink for performing data communication related to an application with another NAN device, under the control of the NAN control unit 302. The NAN datalink communication control unit 304 performs data communication related to an application through the datalink established by the NAN datalink establishment control unit 303. In this embodiment, as an example, after establishing a datalink, the NAN datalink communication control unit 304 performs control so as to perform communication using IPv6. Processing regarding establishment of a datalink will be described later in detail with reference to FIG. 4.

The application control unit 305 performs control so as to execute a service discovered in the NAN. For example, when the NAN device 101 discovers a print service, the application control unit 305 performs control so as to execute an application for requesting a printing job. In addition, for example, when the NAN device 101 discovers a photograph-sharing service, the application control unit 305 performs control so as to execute an application for exchanging photograph data. The NAN device 101 can search for a plurality of services, and may include a plurality of application control units 305 that respectively correspond to services. Note that, in this embodiment, a chat application is executed between the NAN device 101 and the NAN device 103 as an example.

The UI control unit 306 manages operations performed by the user of the NAN device 101 on the input unit 204, and transmits a necessary signal to another function unit. The storage unit 307 is a function unit that stores programs and data for the NAN device 101 to operate.

In this embodiment, assume that a chat application is searching for a chat partner apparatus, for example, according to the input unit 204 receiving a user's operation after the user of the NAN device 101 started the chat application. Assume that the user of the NAN device 103 also started a chat application, for example, according to the input unit 204 receiving a user's operation, and is waiting for a chat partner apparatus. It is also assumed that, in this embodiment, communication related to a chat application is performed using IPv6 as described above.

Flow of Processing

Figure 4:
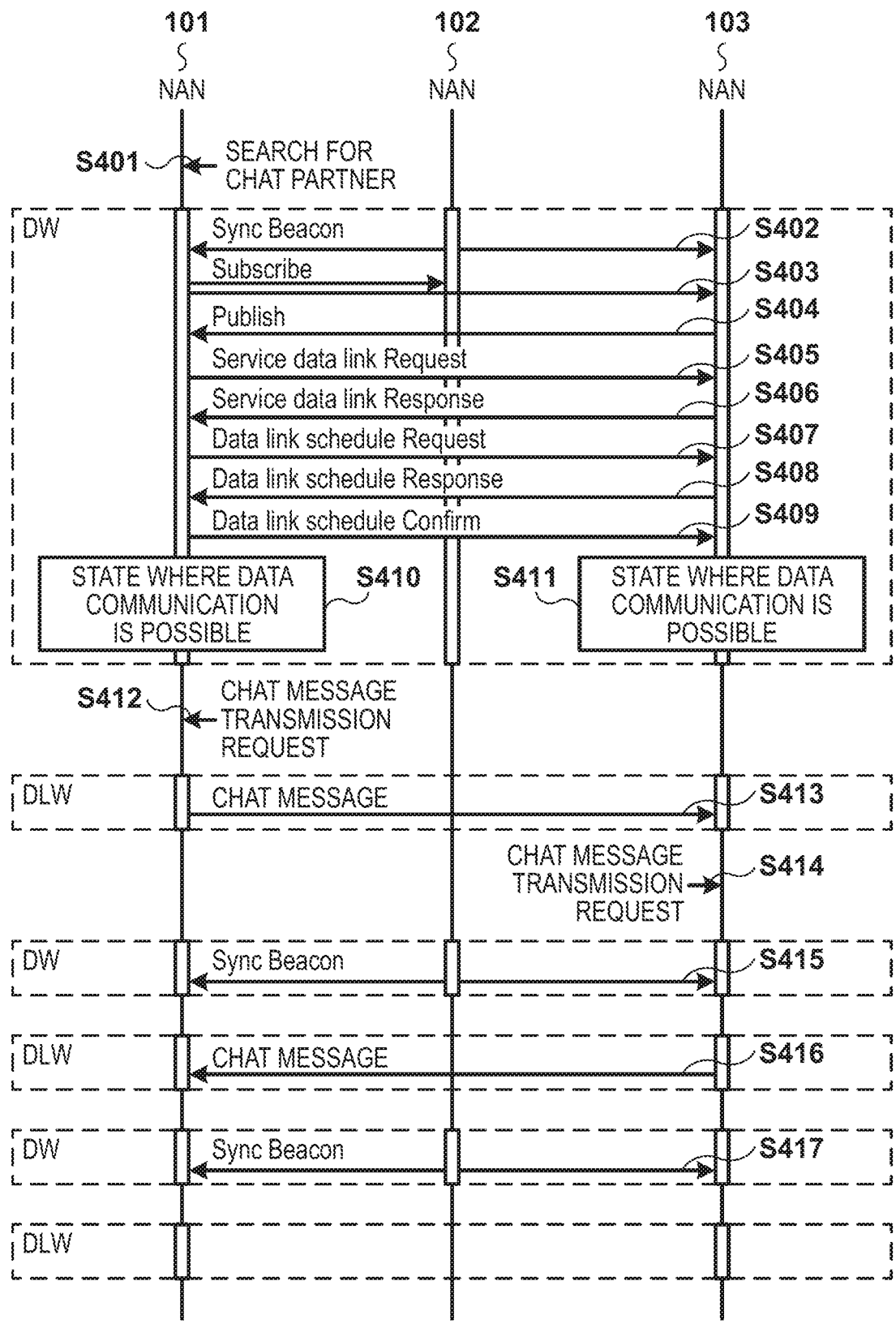
FIG. 4 is a sequence diagram showing an example of a flow of processing when establishing a datalink and performing communication.

A flow of series of processing for discovering a service, establishing a datalink using the NAN, and performing communication related to an application using the established datalink in this embodiment will be described with reference to FIG. 4. Here, assume that the NAN device 101 is searching for a partner apparatus for chat using a chat application, and the NAN device 103 has executed processing for waiting for a partner apparatus of chat using a chat application. Note that in FIG. 4, periods during which these NAN devices keep the RF function on are indicated by vertically long rectangles on the time axes that respectively correspond to the NAN devices. Accordingly, the NAN devices each keep the RF function off in sections indicated by a line, not rectangles.

First, the NAN device 101 receives a user's operation for searching for a partner of chat that is performed using a chat application, via the input unit 204 (step S401). The NAN device 101 starts processing for searching for a partner of chat that is performed using the chat application, according to this user's operation. Note that it is assumed here that the user's operation is performed outside a DW period. In this case, the NAN device 101 will wait for the next DW period to start, and transmit a signal for searching for a chat partner apparatus during the DW period. Note that if the user's operation is received during a DW period, the NAN device 101 may wait for the next DW period, and transmit a signal for searching for a chat partner during the DW period, or transmit the signal during the (current) DW period without waiting for the next DW period. For example, in the case where the user's operation is received at a timing near the end timing of a DW period, the NAN device 101 may wait for the next DW period, and transmit the signal.

When a DW period starts, the NAN device 102 that operates as a Master transmits a Sync Beacon (step S402). The Sync Beacon is a frame prescribed by the NAN standard, and is a signal for communication apparatuses within the NAN cluster 104 to synchronize.

The NAN device 101 transmits a Subscribe message by broadcast during the DW period in order to search for another NAN device that is in a state of supporting the chat application (step S403). At this time, the NAN device 101 can include, in the Subscribe message, information indicating that the NAN device 101 is searching for another NAN device that is in a state of supporting the chat application. For example, the NAN device 101 can store the value of an ID that is associated with the chat application, in a Service ID field included in the Subscribe message. Here, assume that the value of the Service ID indicating the chat application is "10". Upon receiving the Subscribe message in step S403, the NAN device 103 transmits, as a response to the message, a Publish message indicating that the chat application of the NAN device 103 is operating, to the NAN device 101 (step S404). At this time, "10" that is the value of the ID of the chat application is stored in the Service ID field in the Publish message.

Upon receiving the Publish message in step S404, the NAN device 101 transmits a Service data link request that requests for establishment of a datalink for enabling communication using the chat application (step S405). Note that the NAN device 101 may transmit the Service data link request during the same DW period as in step S404. On the other hand, in the case where the DW period ended when the Service data link request was being prepared to be transmitted, the NAN device 101 transmits the Service data link request during the next DW period. Note that there are cases where Further Service Availability indicating that service discovery/search is possible outside a DW period is provided in the Publish message in step S404. In this case, the NAN device 101 may transmit the Service data link request in accordance with such information at a timing outside a DW period during which the NAN device 103 can receive a message.

Figure 5:
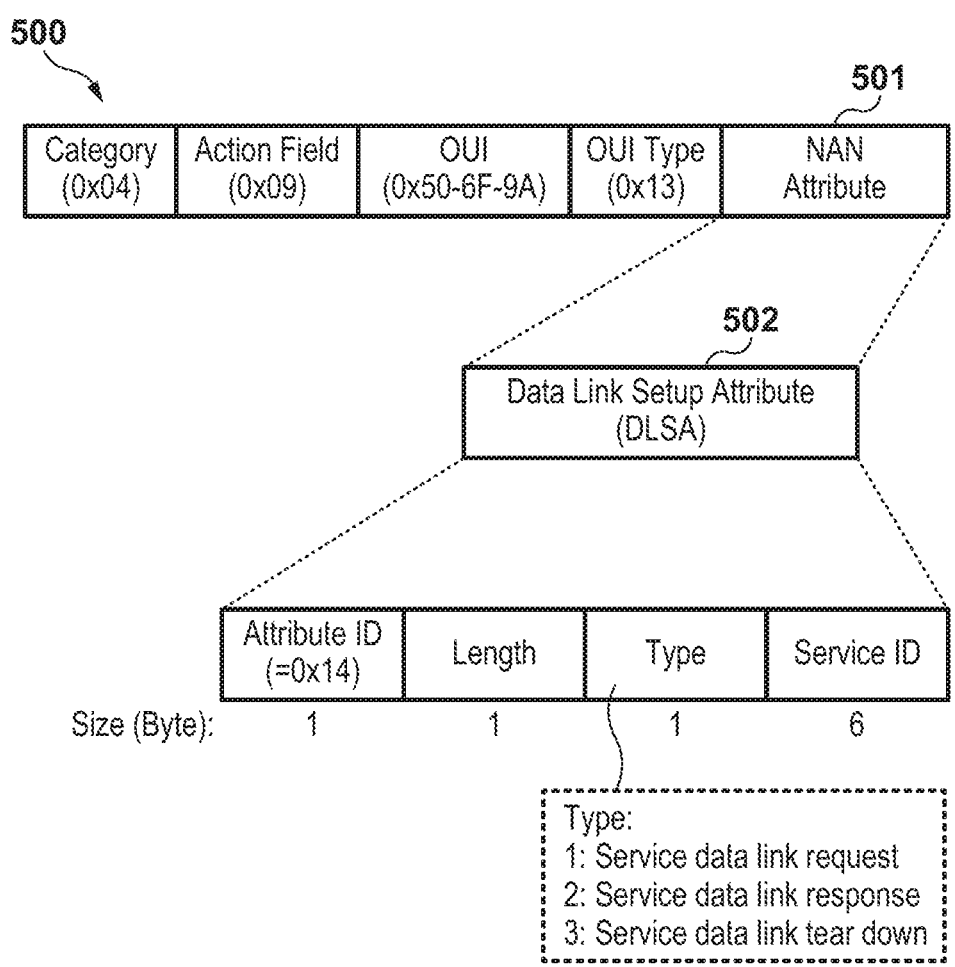
FIG. 5 is a diagram showing a configuration example of an extended Service Discovery Frame (SDF).

Here, the Service data link request can be transmitted/received using a Service Discovery Frame (SDF). A configuration example of the SDF at this time will be described with reference to FIG. 5. As shown in FIG. 5, SDF 500 is an extended SDF of the NAN standard, where a Data Link Setup Attribute (DLSA) 502 is added to NAN Attributes 501. DLSA 502 included in SDF 500 makes it possible for the NAN device 101 to request for establishment of a datalink through the NAN using this SDF 500.

As shown in FIG. 5, in this embodiment, Attribute ID in DLSA 502 is set to "0x14". In addition, for example, a value of one of 1 to 3 is stored in Type. This value is used for identifying whether the SDF is a Service data link request, a Service data link response, or Service data link tear down. It is the Service data link request that is transmitted in step S405 in FIG. 4, and thus "1" that is a value corresponding to this is stored in Type. A value that corresponds to a service for which communication is desired to be performed using a datalink is stored in Service ID. As described above, in step S405 in FIG. 4, "10" that is a numerical value indicating the chat application is stored.

Returning to FIG. 4, upon receiving the Service data link request, the NAN device 103 transmits a Service data link response in response to the request (step S406). The above interaction makes it possible for the NAN device 101 and the NAN device 103 to confirm with each other that a datalink is to be established in order to perform communication during periods other than DW periods while belonging to the NAN, for communication related to the chat application.

Note that the Service data link response is also transmitted/received using SDF 500 as shown in FIG. 5. In this case, unlike the Service data link request, "2" corresponding to the Service data link response is stored as the value of Type of DLSA 502. In addition, similar to the Service data link request, "10" that is a value indicating the chat application is stored in Service ID.

When confirming with each other that a datalink is to be established to perform communication for the chat application, the NAN device 101 and the NAN device 103 next determine specific periods for performing communication. Specifically, the NAN device 101 and the NAN device 103 determine time sections, in periods outside DW periods, during which communication is to be performed. For this determination processing, the NAN device 101 transmits a Data link schedule request to the NAN device 103 (step S407). The Data link schedule request is a message for starting negotiation for determining time sections during which communication is performed.

Figure 6:
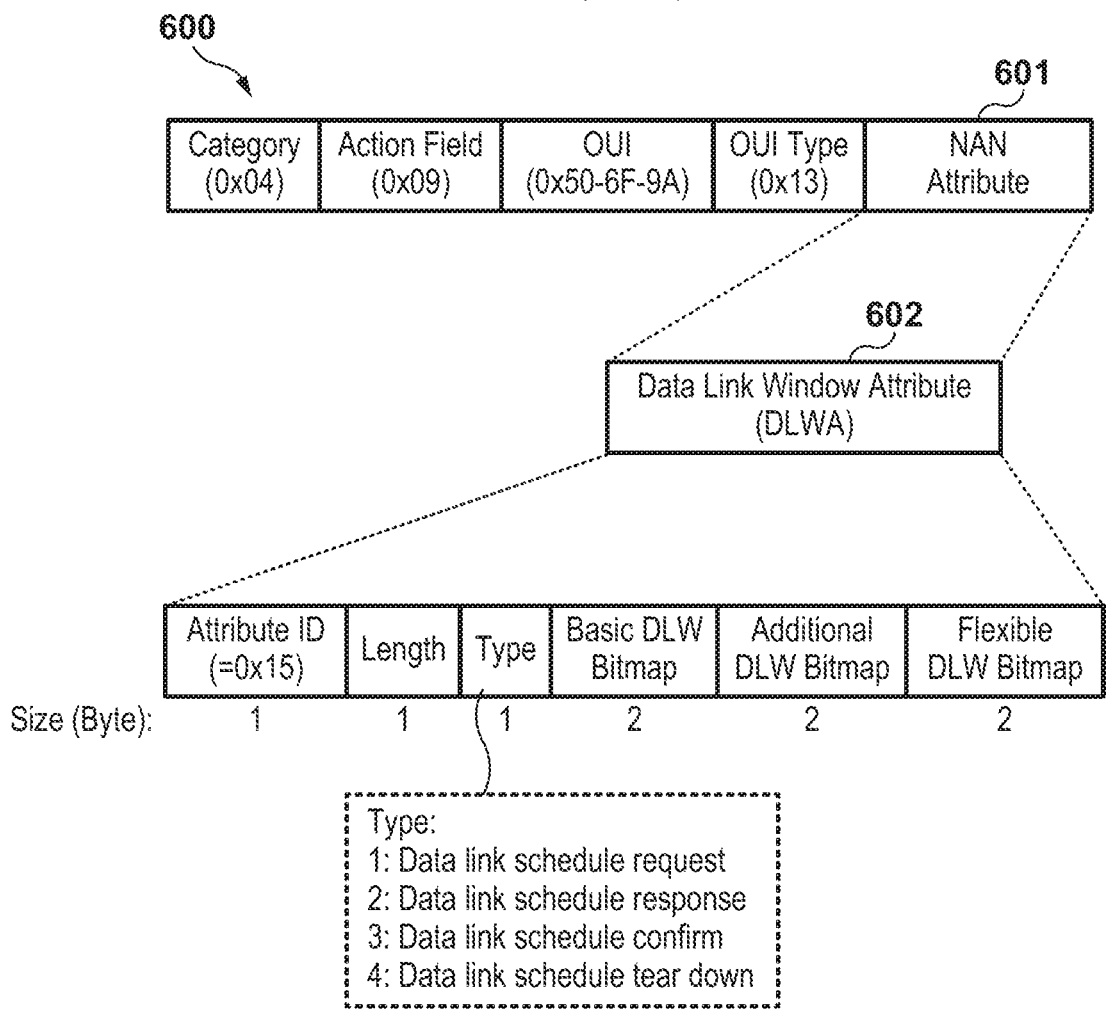
FIG. 6 is a diagram showing a configuration example of an extended Service Discovery Frame (SDF).

The Data link schedule request may also possibly be transmitted using an SDF. FIG. 6 shows a configuration example of SDF 600 that is used as the Data link schedule request. As shown in FIG. 6, SDF 600 is an extended SDF of the NAN standard, where a Data Link Window Attribute (DLWA) 602 is added to NAN Attributes 601. The NAN device 101 can start negotiation with the NAN device 103 regarding a schedule, namely which sections outside DW periods during which communication related to the application is to be performed, by using SDF 600 that includes DLWA 602.

As shown in FIG. 6, in this embodiment, Attribute ID in DLWA 602 is set to "0x15". In addition, "1" is included in Type as a value for requesting for start of scheduling such that it is possible to identify that this SDF is a Data link schedule request. Note that by setting the value of Type to "2", it is possible to indicate that the SDF is a Data link schedule response, and by setting the value of Type to "3", it is possible to indicate that the SDF is Data link schedule confirm. In addition, by setting the value of Type to "4", it is possible to indicate that the SDF is Data link schedule tear down.

The NAN device 101 can designate a section that is requested in order to perform data communication, using Basic DLW Bitmap, Additional DLW Bitmap, and Flexible DLW Bitmap fields. Basic DLW Bitmap indicates sections (Data Link Windows (DLWs)) during which data communication is performed, the sections being shared by a plurality of NAN devices in a case where a datalink was established between the plurality of NAN devices. For example, in the case of establishing a datalink with a NAN device, and then requesting for establishment of a datalink with another NAN device while maintaining the former datalink, it is possible to designate the same Basic DLW Bitmap as the established datalink. Note that the NAN device 101 may designate different Basic DLW Bitmaps for a plurality of NAN devices that are communication partners.

Additional DLW Bitmap and Flexible DLW Bitmap can be unique for each NAN device with which a datalink is established. For example, in the case such as where communication of a large amount of data with a specific NAN device is desired to be performed, and data communication with another NAN device is not desired in the same section, or the like, time sections are designated using these fields. Note that Additional DLW Bitmap designates candidates for sections that cannot be rejected using Data link schedule confirm that may be transmitted according to receipt of a Data link schedule response. On the other hand, Flexible DLW Bitmap designates candidates for sections that may be rejected using Data link schedule confirm. A detailed description thereof will be given later.

The bits in each DLW Bitmap respectively correspond to sections of predetermined lengths (e.g., 16 TU), where the end timing of a DW period serves as a start point. In the case where a DW period starts at 0 TU, and 16 TU is a time immediately after the DW period ends, and the above-described predetermined length is 16 TU, the Nth bit corresponds to a section of (N+1)×16 TU to (N+2)×16 TU. Specifically, if the Nth bit is 1 in the DLW Bitmap in the Data link schedule request, the section of (N+1)×16 TU to (N+2)×16 TU is a section requested for data communication. According to this concept, for example, if the 0th bit is 1 in DLW Bitmap, a section of 16 to 32 TU is a section requested for data communication, and if the 2nd bit is 1, a section of 48 to 64 TU is a section requested for data communication. 1 may be designated for multiple bits in DLW Bitmap. In this manner, periods that are outside DW periods, and during which data communication is performed may be designated using DLW Bitmap fields. Note that any technique that makes it possible to designate periods outside DW periods may be used as a method for designating periods during which data communication is performed. For example, in the above-described example, the bits in DLW Bitmap respectively correspond to sections of the same time lengths as those of DW periods, but the present invention is not limited thereto, and the bits in DLW Bitmap may correspond to sections of shorter time lengths, or may correspond to sections of longer time lengths. In addition, a bitmap does not necessarily need to be used. For example, in the case where a section of (N+1)×16 TU to M×16 TU is designated, a value N corresponding to the start point of the time section and a value M−N−1 corresponding to the length may be used for designating a period outside a DW period.

Here, assume that, in the Data link schedule request, 0x2 is designated for Basic DLW Bitmap, 0x3 is designated for Additional DLW Bitmap, and 0x4 is designated for Flexible DLW Bitmap. Accordingly, assume that, in the case where a DW period starts at 0, a period of 32 to 48 TU is designated as Basic DLW, a period of 48 to 64 TU is designated as Additional DLW, and a period of 64 TU to 80 TU is designated as Flexible DLW. This makes it possible for the NAN device 101 to designate these data communication request time sections outside DW periods, for the NAN device 103.

Returning to FIG. 4, upon receiving the Data link schedule request, the NAN device 103 transmits a Data link schedule response in response to the request (step S408). The Data link schedule response may also possibly be transmitted using SDF 600 in FIG. 6. Note that "2" indicating the Data link schedule response is stored in Type of DLWA 602. In addition, also in the Data link schedule response, the apparatus that transmitted the response (the NAN device 103) designates periods that are outside of DW periods, and during which data communication is requested to be performed, using DLW Bitmap fields. At this time, time sections designated in the DLW Bitmaps and the time sections designated in the Data link schedule request do not necessarily need to match, and periods requested by the NAN device 103 are designated. As a matter of course, the DLW Bitmaps may match between the Data link schedule request and the Data link schedule response. Thus, the NAN device 103 may set values that are stored in the DLW Bitmaps to be respectively the same values as the values designated in the Data link schedule request, unless there are exceptional circumstances. Note that it is assumed here that the NAN device 103 set Basic DLW Bitmap to 0x2, Additional DLW Bitmap to 0x3, and Flexible DLW Bitmap to 0x5.

Upon receiving the Data link schedule response, the NAN device 101 transmits Data link schedule confirm in order to finally confirm periods during which data communication is possible (step S409). The Data link schedule confirm is also transmitted using SDF 600 as shown in FIG. 6, and in this case, 3 is stored in Type of DLWA 602. The same values as the values set in the Data link schedule response are set in Basic DLW Bitmap and Additional DLW Bitmap of the Data link schedule confirm. On the other hand, a value that is not set in the Data link schedule response is not allowed to be designated in Flexible DLW Bitmap of the Data link schedule confirm. Note that, it suffices that a subset of the value that is set in the Data link schedule response is set in Flexible DLW Bitmap of the Data link schedule confirm, and the values do not necessarily need to match. Here, while 0x4 is designated in Flexible DLW Bitmap in step S407, 0x5 is designated in step S408, and thus periods respectively requested by the NAN devices 101 and 103 do not overlap. Thus, the NAN device 101 set Flexible DLW Bitmap of the Data link schedule confirm to 0x0. Therefore, the NAN device 101 transmits the Data link schedule confirm in which Basic DLW is set to a period of 32 to 48 TU, and Additional DLW is set to a period of 48 to 64 TU. Note that, as described above, Flexible DLW Bitmap is 0 (there is no bit to which "1" is set), and thus is not set. Accordingly, it is agreed upon between the NAN device 101 and the NAN device 103 that data communication is to be performed during a time section of a length of 32 TU that starts at 16 TU immediately after a DW period ends.

A datalink of the NAN is established, and both the NAN device 101 and the NAN device 103 enter a state where communication using the chat application can be performed (steps S410 and S411). After this, wireless packet transmission/reception is performed between the NAN device 101 and the NAN device 103 during not only DW periods, but also the DLW periods designated in the Data link schedule confirm. Accordingly, the NAN device 101 and the NAN device 103 can perform communication using the datalink that was set for periods outside DW periods, in a state where communication during DW periods can be continued.

Assume that the user of the NAN device 101 requested for transmission of a chat message in a state where chat can be performed (step S412). In this case, the NAN device 101 transmits the chat message to the NAN device 103 after a DLW period starts (step S413). Upon receiving the chat message, the NAN device 103 notifies the user of the NAN device 103 of the chat message via the output unit 205 (e.g., a display), for example. Assume that the user of the NAN device 103 requests for transmission of a chat message after that (step S414). The NAN device 103 transmits the chat message accordingly when a DLW period starts (step S416). Note that the example in FIG. 4 shows a case where a DW period started between a request for transmitting a chat message and actual transmission of the chat message. The NAN device 102 transmits a Sync Beacon during DW periods (steps S415 and S417).

Figure 7:
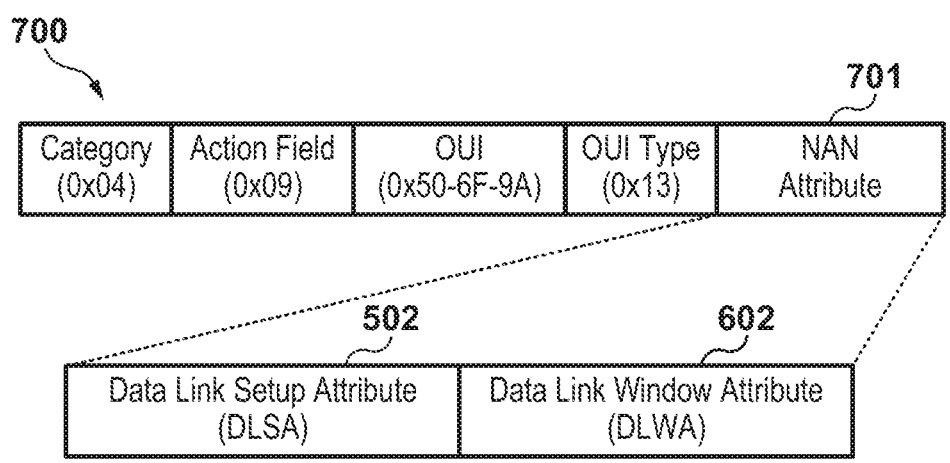
FIG. 7 is a diagram showing a configuration example of an extended Service Discovery Frame (SDF).

Note that the Service data link request and the Data link schedule request may be integrated by adding DLWA 602 in FIG. 6 to SDF 500 in FIG. 5, and be transmitted/received. FIG. 7 shows a configuration example of the SDF at this time. In FIG. 7, SDF 700 is an extended SDF of the NAN standard, where DLSA 502 and DLWA 602 are included in NAN Attributes 701. Functions of the Attributes are as described with reference to FIGS. 5 and 6, and thus a detailed description is omitted here.

The NAN device 101 can set the values of the Attributes in a similar manner to the values that were set in the messages transmitted in steps S405 and S407, and transmit a Request using this SDF 700. Upon receiving an integrated frame in the SDF 700 format, the NAN device 103 transmits a response acquired by integrating the Service data link response and the Data link schedule response. The NAN device 103 sets the values of the Attributes in a similar manner to the values that were set in the messages transmitted in steps S406 and S408. In this case, the requests in step S405 and S407 are made at the same time, and after that, the responses in steps S406 and S408 are made at the same time. Hereinafter, this technique is referred to as Fast data link setup.

Figure 8:
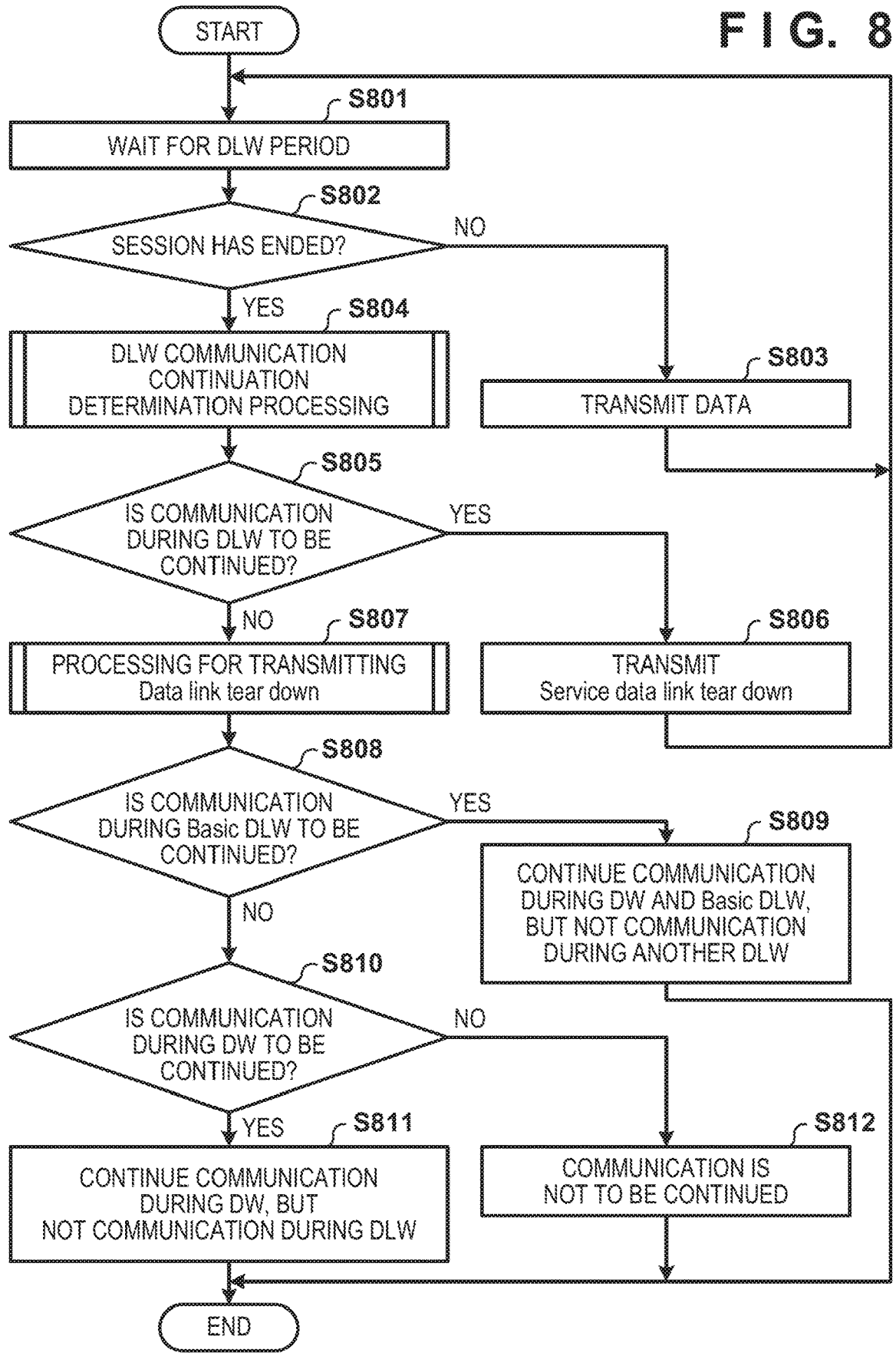
FIG. 8 is a flowchart showing an example of a flow of processing that is executed when ending data communication.

Subsequently, processing when a NAN device that has set DLWs for data communication during time sections outside DW periods as described above ends communication during DLWs will be described with reference to FIG. 8. This processing is executed in the background when a chat application is operating in the NAN devices 101 to 103. Processing when the NAN device 101 that has set DLWs between the NAN device 101 and the NAN device 103 ends communication during DLW periods using the chat application will be described below. Note that a technique to be described below can be executed also when another NAN device within the NAN cluster 104 ends data communication. This processing is started in cases such as where chatting has not been performed between the NAN device 101 and the NAN device 103 for a certain period of time, or the NAN device 101 left the chat room. The NAN device 101 may start this processing also in the case of stopping communication during DLWs in order to perform communication using another standard when performing photograph-sharing or the like with a device that is not compatible with the NAN.

In this processing, first, the NAN device 101 waits for a DLW period to start (step S801). The NAN device 101 keeps a wireless transmission/reception function (e.g., the RF function) off during periods outside DW periods and DLW periods. The NAN device 101 checks whether or not a session according to the application has ended when a DLW period started (step S802). If the session has not ended (NO in step S802), the NAN device 101 performs data transmission/reception during DLW periods until the session ends (step S803). On the other hand, if the session has ended (YES in step S802), the NAN device 101 determines whether or not to continue signal transmission/reception to/from the NAN device 103 during DLW periods (steps S804 and S805). This determination processing will be described later in detail with reference to FIG. 9.

If signal transmission/reception during DLWs is to be continued (YES in step S805), the NAN device 101 transmits Service data link tear down (step S806). The Service data link tear down is a frame in which Type is set to 3 in the SDF in FIG. 5. Accordingly, the datalink related to the chat application whose session was determined to have ended is released between the NAN device 101 and the NAN device 103.

In addition, due to the Service data link tear down, the NAN device 101 and the NAN device 103 can mutually understand which application the data that is being transmitted/received during DLW periods is related to. For example, a case is examined in which another application such as a coupon distribution application has been executed between the NAN device 101 and the NAN device 103 in addition to the chat application. In this case, as will be described later with reference to FIG. 9, the NAN device 101 has executed communication related to a plurality of services, and thus it may be determined that communication during DLWs is to be continued. Assume that, however, the priority of data transmission/reception of the coupon distribution application is not high enough for the NAN device 103 to use DLW periods. In this case, the NAN device 103 may determine to end communication during DLW periods, at the time when receiving, from the NAN device 101, the Service data link tear down that corresponds to the chat application. As a result, the NAN device 103 may execute processing of step S807 according to this determination (NO in step S805).

After step S806, the NAN device 101 and the NAN device 103 continue communication during DLW periods, regarding applications other than the chat application. On the other hand, if it is determined to not continue communication during DLWs (NO in step S805), the NAN device 101 transmits Data link schedule tear down to the NAN device 103 (step S807). The Data link schedule tear down is a frame in which the value of Type is set to 4 in SDF 600 in FIG. 6, and is a frame that can designate and release at least a portion of DLWs that have been set. The NAN device 101 can end communication during the DLW periods set between the NAN device 101 and the NAN device 103, by transmitting the Data link schedule tear down, and release at least a portion of the DLW periods that have been set. This processing will be described later in detail with reference to FIG. 10.

Note that, at this time, a case may be envisioned in which it is desired for the NAN device 101 to continue interaction with the NAN device 103 during DLW periods, but there is no application for communicating data between the NAN device 101 and the NAN device 103 during DLW periods. In this case, the NAN device 101 can transmit a Service data link tear down signal only, and wait for a signal during DLW periods.

Next, the NAN device 101 determines whether or not to continue signal transmission/reception during Basic DLWs (step S808). For example, a case is examined in which the NAN device 101 sets DLWs for a chat application between the NAN device 101 and the NAN device 103, and the NAN device 101 sets DLWs for a photograph-sharing application between the NAN device 101 and the NAN device 102. In this case, the NAN device 101 may set Basic DLWs that are common to the NAN device 102 and the NAN device 103. Therefore, in this case, even when the NAN device 101 ends communication with the NAN device 103 during DLWs, the NAN device 101 continues signal transmission/reception during DLWs. On the other hand, in the case where Basic DLW periods that have been set between the NAN device 101 and the NAN device 102 and Basic DLW periods that have been set between the NAN device 101 and the NAN device 103 are different, the NAN device 101 ends signal transmission/reception during the Basic DLWs that have been set between the NAN device 101 and the NAN device 103. In addition, in the case where the NAN device 103 has set DLWs only between the NAN device 103 and the NAN device 101, the NAN device 103 ends signal transmission/reception during DLWs and Basic DLWs.

If it is determined that signal reception during Basic DLWs is to be continued (YES in step S808), the NAN device 101 continues signal transmission/reception during DW periods and Basic DLW periods. On the other hand, the NAN device 101 ends communication during DLW periods that have been set in addition to the Basic DLWs (step S809). Accordingly, the NAN device 101 continues communication using the datalink between the NAN device 101 and the NAN device 102, but does not wait for signal reception during DLW periods that have been set between the NAN device 101 and the NAN device 103 any longer. On the other hand, if it is determined that signal reception during Basic DLWs is to be ended (NO in step S808), the NAN device 101 subsequently determines whether or not to perform signal transmission/reception during DW periods (step S810). In step S810, a method for determining whether or not to continue signal transmission/reception during DW periods will be described with reference to FIGS. 11A and 11B and FIGS. 12A and 12B.

Figure 11A:
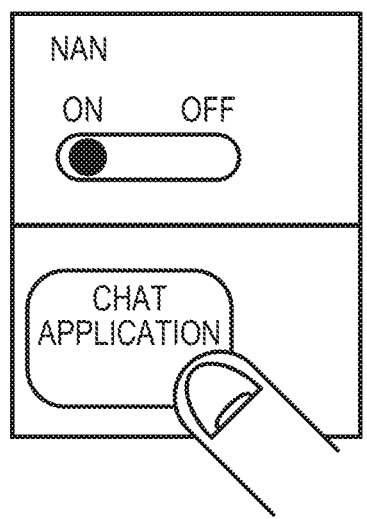
FIG. 11A is a conceptual diagram showing a state of an operation of a user interface (UI).
Figure 11B:
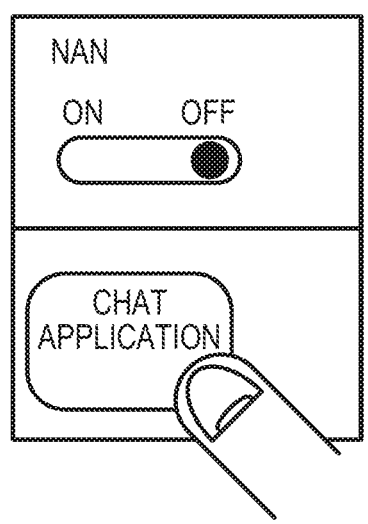
FIG. 11B is a conceptual diagram showing a state of an operations of a user interface (UI).

FIGS. 11A and 11B show the state of an operation of the user interface (UI) when a chat application is started in the NAN device 101. Note that the chat application will be described with reference to FIGS. 11A and 11B, but similar processing may be performed also in the case where another application that involves communication during DLW periods is used. In addition, not only the NAN device 101 but also other NAN devices within the NAN cluster 104 can perform similar processing. This applies to FIGS. 12A and 12B.

FIG. 11A shows a state where the NAN is already started when starting a chat application. Specifically, FIG. 11A shows an example of a case of starting a chat application when the NAN device 101 has been performing signal transmission/reception during DW periods. On the other hand, FIG. 11B shows a state where the NAN is not started yet when starting a chat application. Specifically, in the case in FIG. 11B, the NAN device 101 starts signal transmission/reception during DW periods after starting a chat application.

Figure 12A:
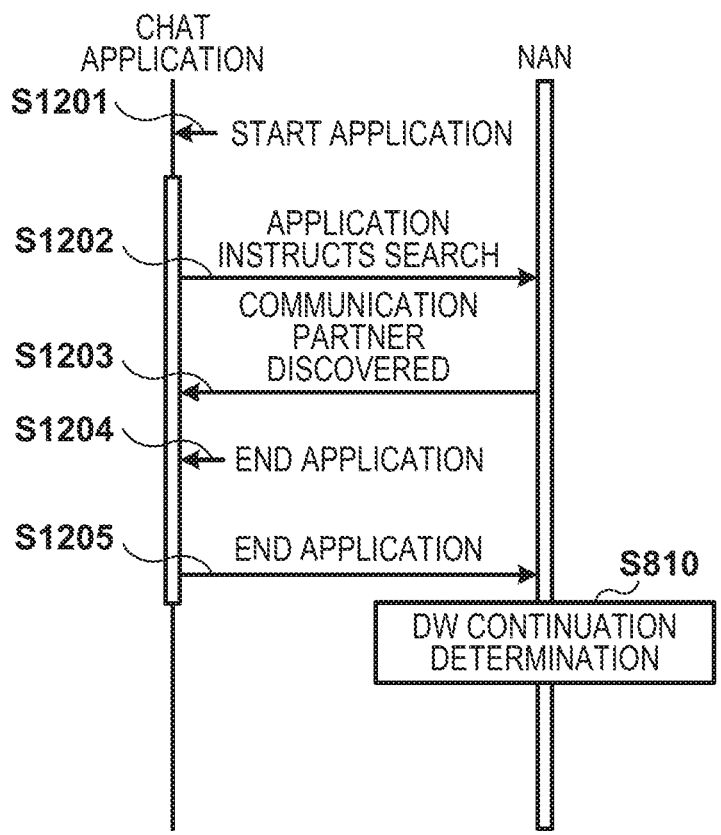
FIG. 12A is a sequence diagram showing the relationship of processing between an application and a NAN.

FIG. 12A is a sequence diagram showing a flow of series of processing from a start to an end of the chat application in the case in FIG. 11A. The user of the NAN device 101 starts the chat application while performing signal transmission/reception during DW periods (step S1201). In this case, the application instructs the NAN function to search for a partner apparatus for chat during DW periods (step S1202). When a communication partner is discovered, the NAN function notifies the application of the discovery (step S1203). After that, the NAN device 101 transmits/receives chat-related data during DLW periods (not illustrated). When the user of the NAN device 101 ends the application (step S1204), the application instructs the NAN function to end communication during DLW periods (step S1205). After that, the NAN device 101 determines whether or not to continue signal transmission/reception during DW in step S810. At this time, the NAN device 101 had been performing communication during DW periods before the chat application was started. Thus, the NAN device 101 determines to perform signal transmission/reception only during DW period, and to not perform signal transmission/reception during DLW periods (YES in steps S810 and S811). Accordingly, search for another application can be continued even after signal transmission/reception during DLW periods ends in the chat application.

Figure 12B:
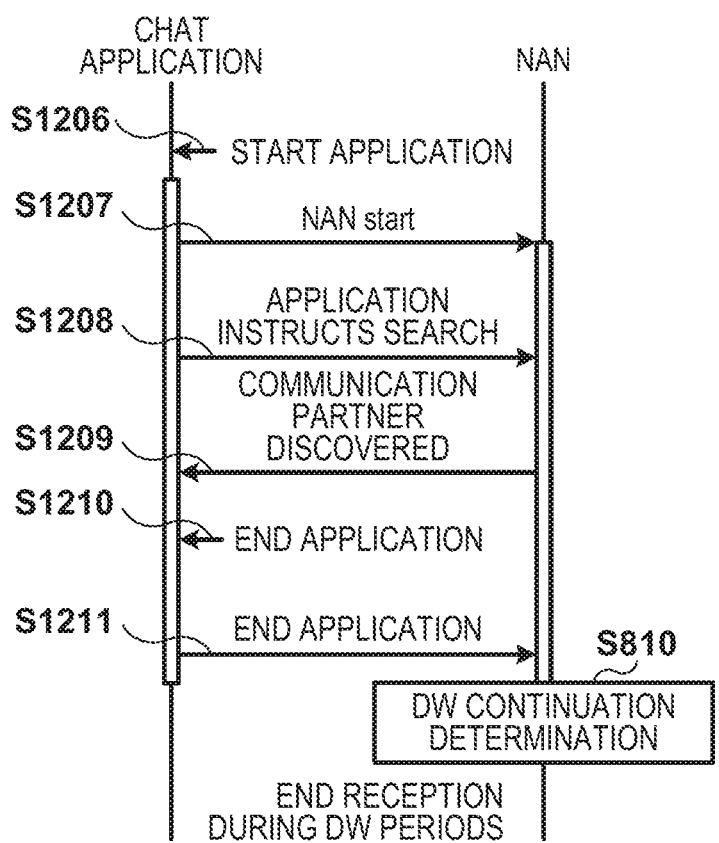
FIG. 12B is a sequence diagram showing the relationship of processing between an application and a NAN.

FIG. 12B is a sequence diagram showing a flow of series of processing from a start to an end of the chat application in the case in FIG. 11B. The user of the NAN device 101 starts the chat application in the state where signal transmission/reception is not performed during DW periods (step S1206). In this case, the application instructs the NAN function to operate the NAN (step S1207), and after that, instructs the NAN function to search for a chat partner during DW periods (step S1208). If a communication partner is discovered, the NAN function notifies the application of the discovery (step S1209). After that, the NAN device 101 transmits/receives chat-related data during DLW periods (not illustrated). When the user of the NAN device 101 ends the application (step S1210), the application instructs the NAN function to end communication during DLW periods (step S1211). After that, the NAN device 101 determines whether or not to continue signal transmission/reception during DW in step S810. In this case, the NAN device 101 started signal transmission/reception during DW periods according to the start of the chat application, and has not been performing signal transmission/reception during DW periods before the application was started. Thus, the NAN device 101 determines to not perform signal transmission/reception during DW periods (NO in step S810 and step S812). Accordingly, it is possible to suppress unnecessary power consumption due to signal transmission/reception being performed during DW periods although the NAN device 101 is not required to search for a communication partner during DW periods.

Note that, in the case where the chat application searches for another partner apparatus, the NAN device 101 may determine to continuously perform signal transmission/reception during DW periods.

In addition, a case is examined in which signal transmission/reception was started during DW periods in order to search for a communication partner in an application such as a photograph-sharing application different from the chat application, in the case in FIG. 11A. In this case, when ending the chat application, the NAN device 101 has already discovered a communication partner of the photograph-sharing application. At this time, when it is not necessary to perform signal transmission/reception to/from this communication partner during DW periods, the NAN device 101 may determine to not continue signal transmission/reception during DW periods. This makes it possible for the NAN device 101 to reduce the power consumption due to waiting for signal reception during DW periods.

In addition, in the case in FIG. 11B, a case is examined in which a printer search application starts to search for a communication partner during DW periods while communication during DLW periods is being performed using the chat application. In this case, if the printer search application is still searching for a communication partner during a DW period when the chat application ends, the NAN device 101 may determine to continue signal transmission/reception during DW periods. This makes it possible for the NAN device 101 to continuously search for a communication partner of the printer search application during DW periods.

Note that, when the NAN device 101 needs to discontinue communication in the NAN for communication using another standard or the like, the NAN device 101 may determine to not continue signal transmission/reception during DW.

Figure 9:
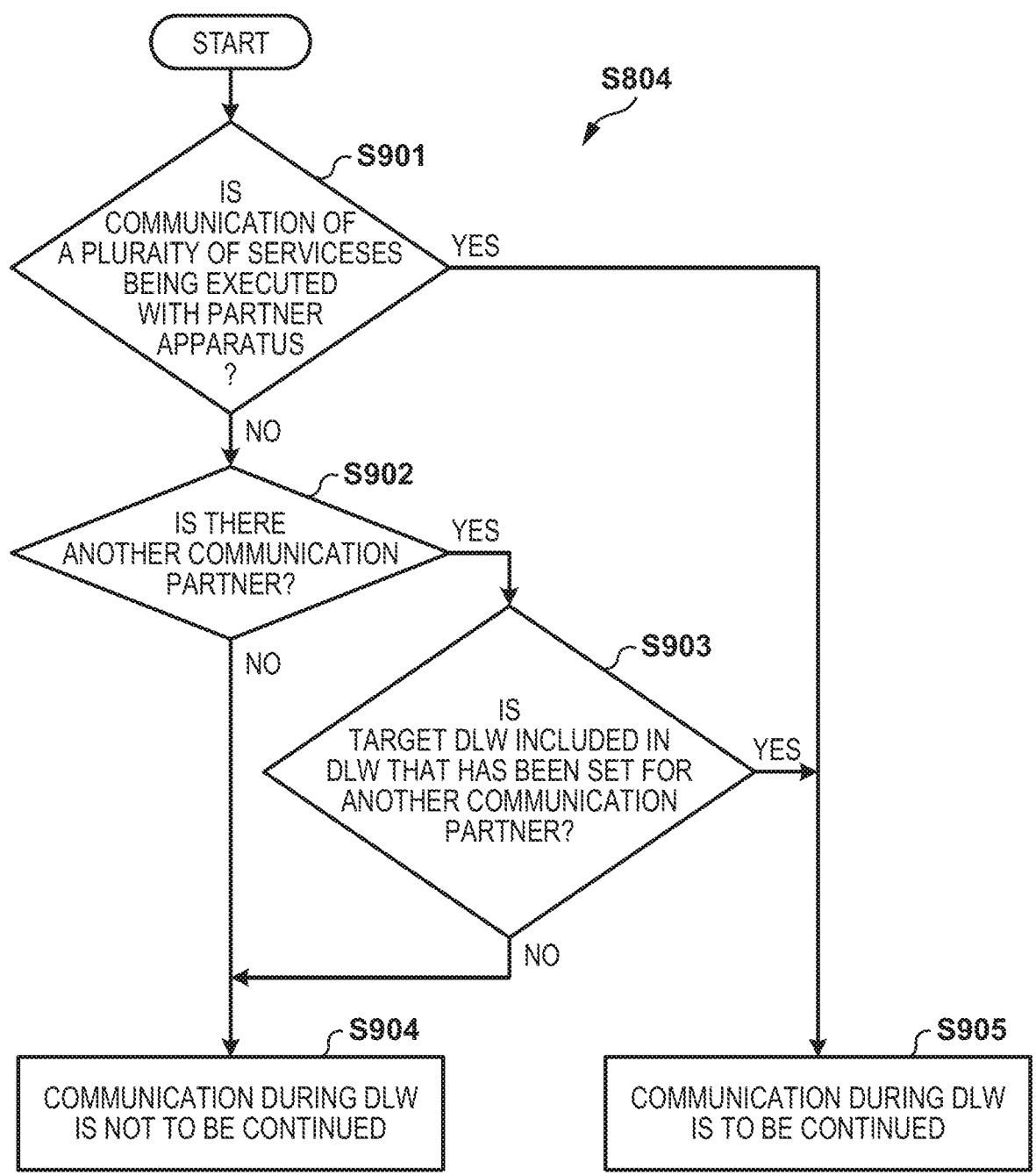
FIG. 9 is a flowchart showing an example of a flow of processing for determining whether or not to continue communication during DLW periods.

Subsequently, processing for determining whether or not to continue communication during DLWs will be described with reference to FIG. 9. This processing is executed in the background when a chat application is operating in the NAN devices 101 and 103. Description will be given below as processing when the NAN device 101 that has set DLWs between the NAN device 101 and the NAN device 103 ends communication using a chat application during a DLW period, but another NAN device within the NAN cluster 104 can also execute similar processing.

First, the NAN device 101 checks whether or not there is an application that performs signal transmission/reception during DLW periods between the NAN device 101 and the NAN device 103 in addition to the chat application (step S901). If there is another application that is performing data transmission/reception during DLW periods between the NAN device 101 and the NAN device 103 (YES in step S901), the NAN device 101 continues signal reception during DLWs (step S905). For example, if the NAN device 101 is performing communication using a photograph-sharing application with the NAN device 103 during DLW periods, the NAN device 101 determines to continue communication during DLWs in order to transmit/receive photograph data during DLW periods.

On the other hand, if there is no other application that is performing communication during DLW periods between the NAN device 101 and the NAN device 103, the NAN device 101 checks whether or not the NAN device 101 has set DLWs that are shared with a partner apparatus other than the NAN device 103, and is performing communication with the partner apparatus (step S902). If there is no other partner apparatus (NO in step S902), the NAN device 101 does not continue communication during the DLWs (step S904). On the other hand, if there is another partner apparatus (YES in step S902), the NAN device 101 determines whether or not all of the DLWs that have been set between the NAN device 101 and the NAN device 103, and are targets for determining whether or not to continue communication are included in the DLWs that have been set between the NAN device 101 and the NAN device 102 (step S903). After that, if all the DLWs that are targets for determining whether or not to continue communication are included in the DLWs that have been set between the NAN device 101 and the NAN device 102 (YES in step S903), the NAN device 101 continues communication during DLWs (step S905). On the other hand, if the DLWs that are targets for determining whether or not to continue communication are not included in the DLWs that have been set between the NAN device 101 and the NAN device 102 (NO in step S903), the NAN device 101 does not continue communication during DLWs (step S904). Note that, if the DLWs that are targets for determining whether or not to continue communication partially overlap the DLWs that have been set between the NAN device 101 and the NAN device 102, the NAN device 101 continues communication during the overlapping portion of the DLWs, and does not continue communication during the remaining portion.

Due to the determinations in steps S902 and S903, the NAN device 101 can avoid a problem that occurs when DLWs are set again. A case is examined in which the NAN device 101 and the NAN device 103 once release DLWs that have been set, and then set DLWs again. At this time, in the case where the NAN device 103 sets DLWs with another NAN device, DLW periods desired by the NAN device 101 and DLW periods desired by the NAN device 103 can be different. In this case, it takes time to set DLWs again between the NAN device 101 and the NAN device 103, and, as a result of extending a period during which the NAN device 103 receives a signal, the electrical power can be wasted. In contrast, by maintaining the DLWs that have been set, the NAN device 101 can omit a procedure when setting DLWs with the NAN device 103 for the chat application again. In addition, in the case where DLWs set between the NAN device 101 and the NAN device 103 are included in DLW periods set between the NAN device 101 and the NAN device 102, the NAN device 101 does not waste the electrical power if communication during DLWs is continued.

In addition, as described above, even in the case where an application for performing communication using DLW periods remains between the NAN device 101 and the NAN device 103, there can be cases where the priority of the application is not high enough to perform communication during DLW periods. In this case, at least one of the NAN device 101 and the NAN device 103 may determine that communication during DLW periods is not to be continued. For example, after it is determined in step S901 that there is an application that involves communication with the partner apparatus during DLWs, at least one of the NAN device 101 and the NAN device 103 may perform processing for determining the priority of the application. Accordingly, unnecessary communication during DLW periods is not performed any longer, and thus the power consumption of the NAN devices can be reduced.

Subsequently, a flow of processing for transmitting a tear down signal in step S807 in a case where communication during DLW periods is to be ended will be described with reference to FIG. 10. Description will be given below as processing when the NAN device 101 that has set DLWs with the NAN device 103 ends communication using a chat application during a DLW period, but other NAN devices within the NAN cluster 104 can also execute similar processing.

First, the NAN device 101 determines whether or not Fast data link setup was used when DLWs were set between the NAN device 101 and the NAN device 103 (step S1001).

In the case where the DLWs were not set using Fast data link setup (NO in step S1001), the NAN device 101 transmits Service data link tear down to the NAN device 103 (step S1002). By transmitting the Service data link tear down, it is clearly indicated that data communication using a chat application during DLW periods is not to be continued. The Service data link tear down can be transmitted using SDF 500 in FIG. 5. Note that, in this case, "3" is stored in Type of DLSA 502 in SDF 500. In addition, similar to step S405, "10" that is a value indicating the chat application is stored in Service ID. This signal corresponds to information for each application established in steps S405 and S406 in FIG. 4.

Next, the NAN device 101 transmits Data link schedule tear down to the NAN device 103 (step S1003). By transmitting the Data link schedule tear down, the NAN device 101 can clearly indicate that data communication is not to be continued during DLW periods set between the NAN device 101 and the NAN device 103. The Data link schedule tear down can be transmitted using SDF 600 in FIG. 6, and in this case, 4 is stored in Type of DLWA 602 in SDF 600. In addition, at this time, 0x0 may be designated for each of Basic DLW Bitmap, Additional DLW Bitmap, and Flexible DLW Bitmap. This signal corresponds to a DLW schedule for each device established in steps S407 to S409 in FIG. 4.

The following advantage is provided by transmitting the Data link schedule tear down in addition to the Service data link tear down. For example, assume that the NAN device 101 recognizes that the NAN device 101 is communicating with the NAN device 103 using only a chat application during DLW periods. Assume that, on the other hand, the NAN device 103 recognizes that the NAN device 103 is communicating with the NAN device 101 using a photograph-sharing application in addition to the chat application during DLW periods. At this time, the NAN device 101 transmits, to the NAN device 103, Service data link tear down corresponding to the chat application. Here, without Data link schedule tear down, the NAN device 101 ends communication during DLW periods, but the NAN device 103 does not end communication during DLW periods, and the electrical power can be wasted. Even in such a case, by the NAN device 101 transmitting the Data link schedule tear down to the NAN device 103, both the NAN devices 101 and 103 can end communication during DLW periods.

On the other hand, in the case where Fast data link setup was used when setting DLWs (YES in step S1001), the NAN device 101 transmits Fast data link tear down to the NAN device 103. The Fast data link tear down can be regarded as a signal acquired by integrating Service data link tear down and Data link schedule tear down signals. SDF700 in FIG. 7 can be used for transmitting the Fast data link tear down. The values of the fields at this time are similar to those described in steps S1002 and S1003, and thus a detailed description thereof is omitted.

Note that determination in step S1001 on whether or not to transmit the Fast data link tear down may be performed based on the bit value of a predetermined frame. For example, a configuration may be adopted in which a field for indicating the version information is added to DLWA 602 in FIG. 6, and the determination is performed based on the value. A configuration may also be adopted in which a bit identifying whether or not the device is a model that supports Fast data link tear down is added to DLWA 602, and determination on whether or not to use Fast data link tear down is performed according to whether or not this value is 1. In addition, if the apparatus type of the partner apparatus is known, it may be determined that a Fast data link tear down signal is to be used. These determinations may be performed in the case where a Service data link request and a Data link schedule request were transmitted at the same timing. Accordingly, the NAN device 101 may further perform the above-described determination in the case where DLWs were set using Fast data link setup. On the other hand, in the case where a Service data link request and a Data link schedule request were transmitted at different timings, the above-described determinations do not need to be performed. In this case, the Service data link tear down and the Data link schedule tear down can be transmitted at different timings.

Figure 13:
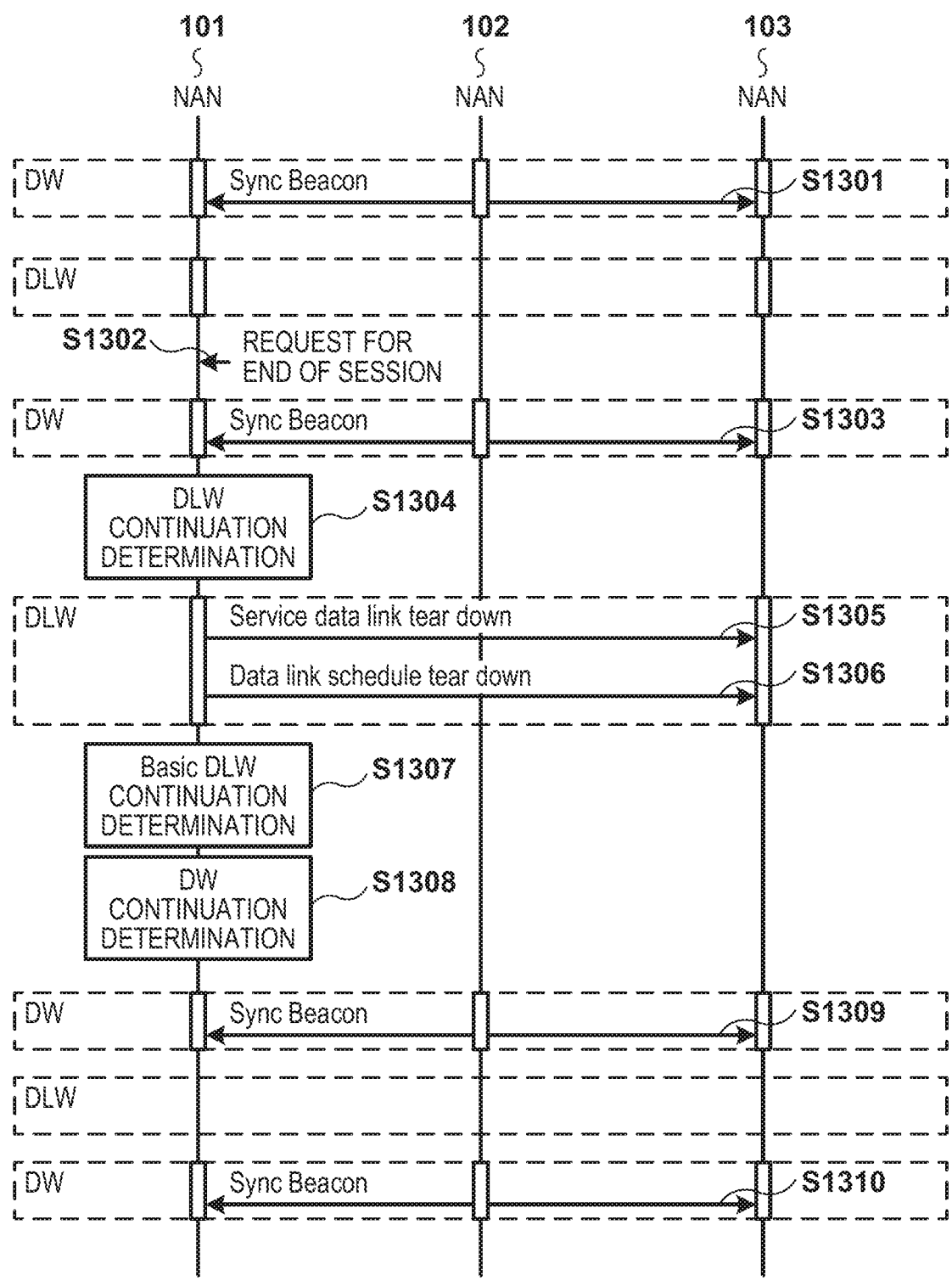
FIG. 13 is a sequence diagram showing an example of a flow of processing that is executed when ending data communication.

Subsequently, a flow of processing in the wireless communication system when ending data communication during DLW periods will be described with reference to FIG. 13. Assume that, in FIG. 13, the NAN device 101 has been chatting with the NAN device 103 using a chat application, and interaction between those two devices has temporarily discontinued although DLWs were set.

Note that, in order to search for/discover a service provided by a NAN device that has joined the NAN cluster 104, the NAN device 102 transmits a Sync Beacon during a DW period that periodically arrives (steps S1301, S1303, S1309, and S1310).

Here, assume that the chat application of the NAN device 101 output a request for closing the session, according to message exchange not having been performed with the NAN device 103 that is a chat partner apparatus for a certain period of time (step S1302). The NAN device 101 then determines whether or not it is necessary to continue communication during DLW periods (step S1304) as described above. Here, assume that the NAN device 101 determines to not continue communication during DLW periods.

Subsequently, the NAN device 101 confirms that the NAN device 103 supports Data link schedule tear down. After that, in order to notify, during a DLW period, that communication using the chat application during DLW periods is to be ended, the NAN device 101 transmits Service data link tear down to the NAN device 103 (step S1305). The NAN device 101 also transmits Data link schedule tear down to the NAN device 103 in order to notify that communication is not to be performed during DLW periods after the current DLW period (step S1306). After that, the NAN device 101 determines whether or not to continue communication during Basic DLW periods (step S1307), and further determines whether or not to continue communication during DW periods (step S1308). Here, assume that the NAN device 101 determines to end communication during Basic DLW periods, but continue communication during DW periods. As a result, the NAN device 101 continues signal transmission/reception during DW periods afterward (step S1309), but does not perform communication during DLW periods afterward, and turns off the RF function, for example. This makes it possible to reduce the power consumption of the NAN device 101.

As described above, in this embodiment, in the case of ending communication during DLW periods, a NAN device explicitly transmits Data link schedule tear down. This makes it possible for the NAN device to prevent continuation of a state where communication can be performed during DLW periods, for a longer time than necessary, and to reduce the power consumption of the NAN device itself and eventually the communication partner apparatus. For example, when the user of the NAN device 101 leaves the chat room, the NAN device 101 transmits a Data link schedule tear down signal to the NAN device 103 that has been a chat partner apparatus. This makes it possible for the NAN device 103 to immediately end communication during DLW periods set between the NAN device 103 and the NAN device 101.

In addition, even if a NAN device ends communication during DLW periods, the NAN device can continue signal transmission/reception during DW periods. This makes it possible for the chat application of the NAN device 101 to execute service discovery at a high speed when starting (resuming) communication with the chat application of the NAN device 102 or 103, for example. In addition, in the case of ending communication according to the chat application while another application is searching for a service, the NAN device can end communication of the chat application during DLW periods while continuing the search.

In addition, in the case where a NAN device is performing communication related to a plurality of services using DLW periods, the NAN device can reduce DLW periods used for communication, in response to communication during DLW periods being ended by an application that has transmitted/received a large amount of data. This also makes it possible to suppress the power consumption of the NAN device.

Note that, in the above embodiment, processing for transmitting Service data link tear down and Data link schedule tear down was described, and processing for receiving Service data link tear down and Data link schedule tear down is substantially similar. Here, it is assumed that the NAN device 101 and the NAN device 103 set DLW periods to communicate with each other, and the NAN device 101 transmitted the notification. At this time, upon receiving the Service data link tear down, the NAN device 103 can recognize that the session has ended, and perform processing from step S1304 onward in FIG. 13. Note that, in this case, Service data link tear down is not required to be transmitted from the NAN device 103 to the NAN device 101. In addition, if Data link schedule tear down is received, the NAN device 103 can determine that communication with the NAN device 101 during DLW periods has been shut off, and execute processing from step S1308 onward. Also at this time, the NAN device 103 is not required to transmit Data link schedule tear down to the NAN device 101.

A case is examined in which Basic DLW periods that are set between the NAN device 101 and the NAN device 102 and Basic DLW periods that are set between the NAN device 101 and the NAN device 103 are the same, and DLW periods other than Basic DLW periods are different. Assume that, at this time, the NAN device 101 ends communication during DLW periods set between the NAN device 101 and the NAN devices 102 and communication during DLW periods set between the NAN device 101 and the NAN device 103 at the same time. In this case, the NAN device 101 may transmit Data link schedule tear down to be transmitted to each of the NAN devices 102 and 103, all at a time during a Basic DLW period. Accordingly, even in the case where the NAN device 101 has been performing communication during DLW periods with a large number of NAN devices, the NAN device 101 can end communication during DLW periods without using many communication bands.

In this embodiment, the NAN device 101 does not wait for the NAN device 103 to return the same notification (or a response) after transmitting Service data link tear down, but the NAN device 101 may wait for this to be transmitted. In this case, even if the NAN device 101 transmitted notification of end of communication during DLWs, when information desired to be transmitted by the NAN device 103 remains, the NAN device 101 can receive the information transmitted by the NAN device 103, and then end communication during DLW periods. In addition, even in the case of waiting for notification from the NAN device 103, the NAN device 101 may end communication during DLW periods according to elapse of a certain period of time without notification.

In addition, in this embodiment, the NAN device 101 transmits Service data link tear down and Data link schedule tear down during DLW periods, but may transmit Service data link tear down and Data link schedule tear down during DW periods.

Other Embodiments

According to the present invention, it is possible to reduce power consumption for communication after a communication apparatus discovers a service.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication apparatus comprising:
one or more processors; and
one or more memories including instructions that, when executed by the one or more processors, cause the communication apparatus to:
perform, during a Discovery Window (DW) compliant with Neighbor Awareness Networking (NAN), first communication regarding a service with another communication apparatus in a NAN cluster in which the communication apparatus and the other communication apparatus are participating;
transmit a first signal having a Service Discovery frame format compliant with the NAN and in which type information included in a NAN Attribute field of the Service Discovery frame format is set to a first value, in a case where the communication apparatus requests establishment of second communication for communication of service data that is based on information regarding the service communicated via the first communication, wherein the second communication is communication via a datalink compliant with the NAN;
perform, during a period different from the DW, the second communication with the other communication apparatus in the NAN cluster; and
transmit, to the other communication apparatus, a second signal having the Service Discovery frame format and in which the type information included in the NAN Attribute field of the Service Discovery frame format is set to a second value that is different from the first value and that indicates that the second communication is to be terminated, in a case where the service data has been communicated with the other communication apparatus and where the second communication with the other communication apparatus is to be ended,
wherein, in a case where a plurality of datalinks are established between the communication apparatus and the other communication apparatus for the second communication and where the communication apparatus has notified the other communication apparatus that a part of the plurality of datalinks is to be ended, the communication apparatus ends the second communication with the other communication apparatus via the part of the plurality of datalinks, but the communication apparatus does not end the second communication with the other communication apparatus via another datalink of the plurality of datalinks.

2. The communication apparatus according to claim 1, wherein the execution of the instructions further causes the communication apparatus to receive a response from the other communication apparatus after transmitting the second signal.

3. The communication apparatus according to claim 2, wherein the execution of the instructions further causes the communication apparatus to end, in a case where the communication apparatus received the response, the second communication with the other communication apparatus.

4. A control method of a communication apparatus comprising:

performing, during a Discovery Window (DW) compliant with Neighbor Awareness Networking (NAN), first communication regarding a service with another communication apparatus in a NAN cluster in which the communication apparatus and the other communication apparatus are participating;

transmitting a first signal having a Service Discovery frame format compliant with the NAN and in which type information included in a NAN Attribute field of the Service Discovery frame format is set to a first value, in a case where the communication apparatus requests establishment of second communication for communication of service data that is based on information regarding the service communicated via the first communication, wherein the second communication is communication via a datalink compliant with the NAN;

performing, during a period different from the DW, the second communication with the other communication apparatus, in the NAN cluster;

transmitting, to the other communication apparatus, a second signal having the Service Discovery frame format and in which the type information included in the NAN Attribute field of the Service Discovery frame format is set to a second value that is different from the first value and that indicates that the second communication is to be terminated, in a case where the service data has been communicated with the other communication apparatus and where the second communication with the other communication apparatus is to be ended, wherein, in a case where a plurality of datalinks are established between the communication apparatus and the other communication apparatus for the second communication and where the communication apparatus has notified the other communication apparatus that a part of the plurality of datalinks is to be ended, the communication apparatus ends the second communication with the other communication apparatus via the part of the plurality of datalinks, but the communication apparatus does not end the second communication with the other communication apparatus via another datalink of the plurality of datalinks.

5. A non-transitory computer-readable storage medium that stores a program for causing a computer included in a communication apparatus to:

perform, during a Discovery Window (DW) compliant with Neighbor Awareness Networking (NAN), first communication regarding a service with another communication apparatus in a NAN cluster in which the communication apparatus and the other communication apparatus are participating;

transmit a first signal having a Service Discovery frame format compliant with the NAN and in which type information included in a NAN Attribute field of the Service Discovery frame format is set to a first value, in a case where the communication apparatus requests establishment of second communication for communication of service data that is based on information regarding the service communicated via the first communication, wherein the second communication is communication via a datalink compliant with the NAN;

perform, during a period different from the DW, the second communication with the other communication apparatus in the NAN cluster; and transmit, to the other communication apparatus, a second signal having the Service Discovery frame format and in which the type information included in the NAN Attribute field of the Service Discovery frame format is set to a second value that is different from the first value and that indicates that the second communication is to be terminated, in a case where the service data has been communicated with the other communication apparatus and where the second communication with the other communication apparatus is to be ended, wherein, in a case where a plurality of datalinks are established between the communication apparatus and the other communication apparatus for the second communication and where the communication apparatus has notified the other communication apparatus that a part of the plurality of datalinks is to be ended, the communication apparatus ends the second communication with the other communication apparatus via the part of the plurality of datalinks, but the communication apparatus does not end the second communication with the other communication apparatus via another datalink of the plurality of datalinks.

6. The communication apparatus according to claim 1, wherein the communication apparatus performs the second communication with the other communication apparatus while maintaining a participation in the NAN cluster.

7. The communication apparatus according to claim 2, wherein the execution of the instructions further causes the communication apparatus to end the second communication with the other communication apparatus before receiving the response from the other communication apparatus after transmitting the second signal.

8. The communication apparatus according to claim 1, wherein the execution of the instructions further causes the communication apparatus to receive, during the DW, a signal indicates a service which the other communication apparatus provides.

9. The communication apparatus according to claim 1, wherein the communication apparatus executes the second communication for executing a service which the other communication apparatus provides.

10. The communication apparatus according to claim 1, wherein the execution of the instructions further causes the communication apparatus to transmit, during the DW, a signal indicates a service which the communication apparatus provides.

11. The communication apparatus according to claim 1, wherein the communication apparatus executes the second communication for executing a service which the communication apparatus provides.

12. The communication apparatus according to claim 1, wherein the execution of the instructions further causes the communication apparatus to determine, in a case where the communication apparatus transmitted the first signal, the period for communicating with the other communication apparatus via the datalink.

13. A communication apparatus comprising:
one or more processors; and
one or more memories including instructions that, when executed by the one or more processors, cause the communication apparatus to:
perform, during a Discovery Window (DW) compliant with Neighbor Awareness Networking (NAN), first communication regarding a service with another communication apparatus in a NAN cluster in which the communication apparatus and the other communication apparatus are participating;
receive, from the other communication apparatus, a first signal having a Service Discovery frame format compliant with the NAN and in which type information in a NAN Attribute field of the Service Discovery frame format is set to a first value indicating a request for establishing second communication, in a case where establishment of second communication for communication of service data that is based on information regarding the service communicated via the first communication is requested, wherein the second communication is communication via a datalink compliant with the NAN;
perform, in a case where the first signal is received, the second communication with the other communication apparatus during a period different from the DW in the NAN cluster; and
receive, from the other communication apparatus, a second signal having the Service Discovery frame format and in which the type information included in the NAN Attribute field of the Service Discovery frame format is set to a second value that is different from the first value and that indicates that the second communication is to be terminated, in a case where the service data has been communicated with the other communication apparatus and where the second communication with the other communication apparatus is to be ended,
wherein, in a case where a plurality of datalinks are established between the communication apparatus and the other communication apparatus for the second communication and where the communication apparatus has been notified by the other communication apparatus that a part of the plurality of datalinks is to be ended, the communication apparatus ends the second communication with the other communication apparatus via the part of the plurality of datalinks, but the communication apparatus does not end the second communication with the other communication apparatus via another datalink of the plurality of datalinks.

14. The communication apparatus according to claim 13, wherein the execution of the instructions further causes the communication apparatus to control, in a case where the second signal is received, so as to end the second communication with the other communication apparatus.

15. The communication apparatus according to claim 14, wherein the communication apparatus release the period different from the DW, in a case where the second signal is received.

16. The communication apparatus according to claim 13, wherein the execution of the instructions further causes the communication apparatus to transmit a response to the other communication apparatus after receiving the second signal.

17. The communication apparatus according to claim 13, wherein the execution of the instructions further causes the communication apparatus to transmit, during the DW, a signal indicates a service which the communication apparatus provides.

18. The communication apparatus according to claim 13, wherein the communication apparatus executes the second communication for executing a service which the communication apparatus provides.

19. The communication apparatus according to claim 13, wherein the execution of the instructions further causes the communication apparatus to receive, during the DW, a signal indicates a service which the other communication apparatus provides.

20. The communication apparatus according to claim 13, wherein the communication apparatus executes the second communication for executing a service which the other communication apparatus provides.

21. A control method of a communication apparatus comprising:
performing, during a Discovery Window (DW) compliant with Neighbor Awareness Networking (NAN), first communication regarding a service with another communication apparatus in a NAN cluster in which the communication apparatus and the other communication apparatus are participating;
receiving, from the other communication apparatus, a first signal having a Service Discovery frame format compliant with the NAN and in which type information in a NAN Attribute field of the Service Discovery frame format is set to a first value indicating a request for establishing second communication, in a case where establishment of second communication for communication of service data that is based on information regarding the service communicated via the first communication is requested, wherein the second communication is communication via a datalink compliant with the NAN;
performing, in a case where the first signal is received, the second communication with the other communication apparatus during a period different from the DW in the NAN cluster; and
receiving, from the other communication apparatus, a second signal having the Service Discovery frame format and in which the type information included in the NAN Attribute field of the Service Discovery frame format is set to a second value that is different from the first value and that indicates that the second communication is to be terminated, in a case where the service data has been communicated with the other communication apparatus and where the second communication with the other communication apparatus is to be ended,
wherein, in a case where a plurality of datalinks are established between the communication apparatus and the other communication apparatus for the second communication and where the communication apparatus has been notified by the other communication apparatus that a part of the plurality of datalinks is to be ended, the communication apparatus ends the second communication with the other communication apparatus via the part of the plurality of datalinks, but the communication apparatus does not end the second communication with the other communication apparatus via another datalink of the plurality of datalinks.

22. A non-transitory computer-readable storage medium that stores a program for causing a computer included in a communication apparatus to:

perform, during a Discovery Window (DW) compliant with Neighbor Awareness Networking (NAN), first communication regarding a service with another communication apparatus in a NAN cluster in which the communication apparatus and the other communication apparatus are participating;

receive, from the other communication apparatus, a first signal having a Service Discovery frame format compliant with the NAN and in which type information in a NAN Attribute field of the Service Discovery frame format is set to a first value indicating a request for establishing second communication, in a case where establishment of second communication for communication of service data that is based on information regarding the service communicated via the first communication is requested, wherein the second communication is communication via a datalink compliant with the NAN;

perform, in a case where the first signal is received, the second communication with the other communication apparatus during a period different from the DW in the NAN cluster; and receive, from the other communication apparatus, a second signal having the Service Discovery frame format and in which the type information included in the NAN Attribute field of the Service Discovery frame format is set to a second value that is different from the first value and that indicates that the second communication is to be terminated, in a case where the service data has been communicated with the other communication apparatus and where the second communication with the other communication apparatus is to be ended, wherein, in a case where a plurality of datalinks are established between the communication apparatus and the other communication apparatus for the second communication and where the communication apparatus has been notified by the other communication apparatus that a part of the plurality of datalinks is to be ended, the communication apparatus ends the second communication with the other communication apparatus via the part of the plurality of datalinks, but the communication apparatus does not end the second communication with the other communication apparatus via another datalink of the plurality of datalinks.

* * * * *